METHOD OF MANUFACTURING A STORAGE MATRIX

Filed March 7, 1968

INVENTORS.
T. HOLTWIJK
W. LEMS
A. G. H. VERHULST
BY
Frank R. Jinfani
AGENT

United States Patent Office 3,561,112
Patented Feb. 9, 1971

3,561,112
METHOD OF MANUFACTURING A STORAGE MATRIX

Theodoor Holtwijk, Willem Lems, and Antonius Gerardus Hendrikus Verhulst, Emmasingel, Eindhoven, Netherlands, assignors, by mesne assignments, to U.S. Philips Corporation, New York, N.Y., a corporation of Delaware Filed Mar. 7, 1968, Ser. No. 711,350
Claims priority, application Netherlands, Mar. 16, 1967, 6703932
Int. Cl. H01f 7/06
U.S. Cl. 29—604 3 Claims

ABSTRACT OF THE DISCLOSURE

A magnetic matrix constructed with crossing conductors of dual insulation, heating the assembly to melt the outer insulation and cause same to flow to form smooth insulating bodies around the crossings, and coating the assembly with magnetic material.

The invention relates to a method of manufacturing a magnetic storage matrix and to a storage matrix made by this method.

Magnetic storage matrices are known which comprise first and second groups of parallel conductors each provided with an insulating layer, the conductors of the first group crossing those of the second group at right angles and a magnetic material surrounding the conductors at the crossings.

Generally, prefabricated annular cores made of a square-loop ferrite are used, the conductors being threaded through the cores according to a two-dimensional pattern.

This threading process is comparatively expensive and has several drawbacks. Such drawbacks are, for example, the possibility of some cores breaking during the threading process and the insulating coating of the wires being damaged by the sharp edges of the holes in the cores so that the insulation between the wires is jeopardized. These disadvantages become increasingly serious in proportion as cores of smaller diameter, for example, of ½ mm. or even less, are used in order to shorten the switching times or to save space.

Hence endeavours have repeatedly been made to find matrix constructions in which the laborious threading of cores is avoided.

It is already known to arrange pills of a plastic ferrite in a manner such that the material embraces the conductors, the whole assembly being subsequently sintered. This is a difficult procedure, especially when the spacing between the conductors is small. In addition there is a risk of the ferrite bodies cracking owing to the differences in the coefficients or thermal expansion of the various materials.

In a method which is suitable for use in the case of a small conductor spacing, a thin layer of a plastic ferrite is provided with tracks of a powdered metal which melts during the sintering of the ferrite and forms conductors in the resulting ferrite body. However, the electric resistance is comparatively high. In addition, the conductor material may diffuse into the ferrite with consequent impairment of the properties of the ferrite.

The present invention provides an extremely simple and cheap method of manufacturing a storage matrix.

Figure 1:
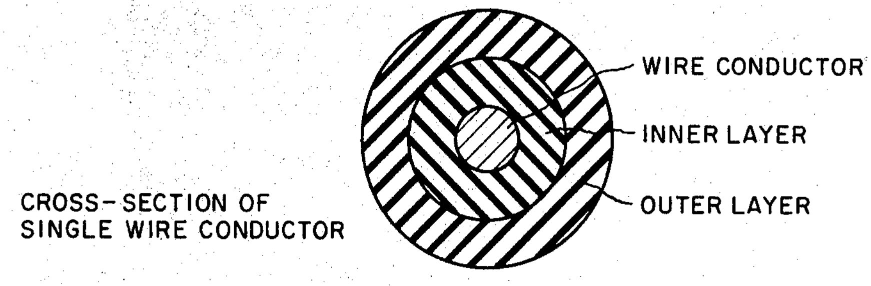
Figure 2:
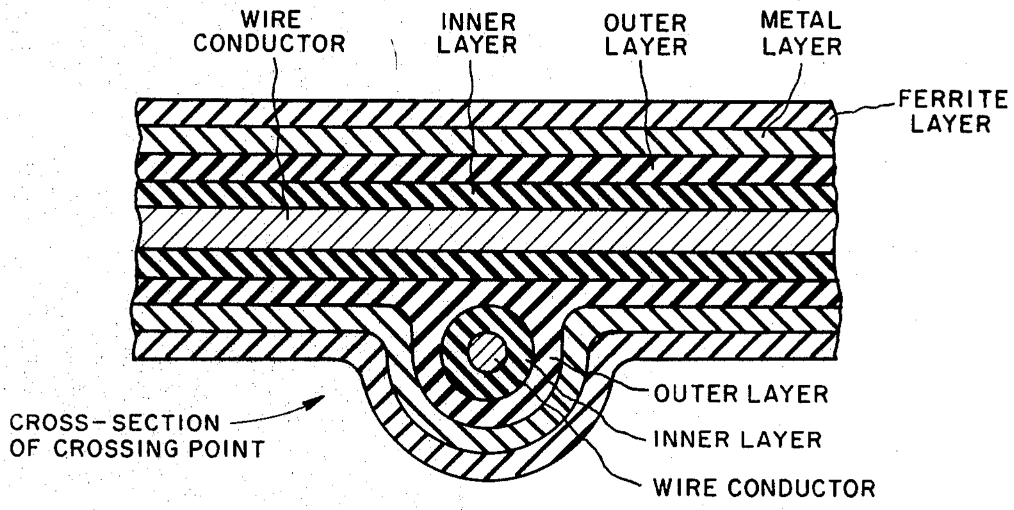
Figure 3:
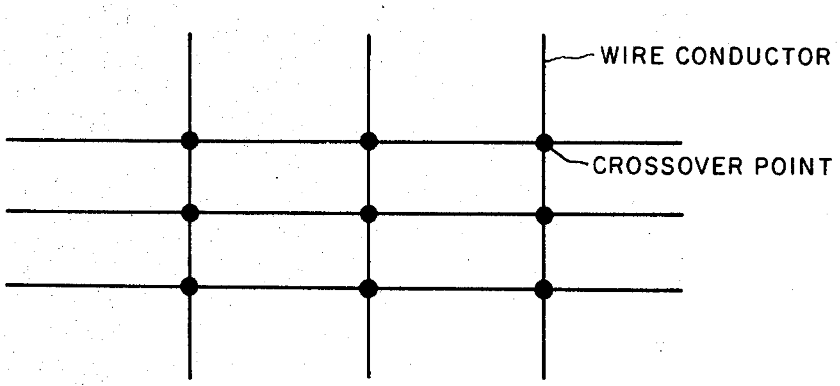

According to the invention, manufacture starts from a system of crossing conductors which are each provided with a first and with a surrounding second layer, the thermal softening point of the second layer being lower than that of the first layer, and the system is heated to a temperature such that the material of the second layer softens and the conductors are mechanically joined together by insulating bodies of smooth outline at the crossings. Subsequently the entire wire system is electrochemically coated with a thin layer of a ferromagnetic material. The method is illustrated generally in FIGS. 1–3, FIG. 1 showing a conductor cross section, FIG. 2 a crossover point, FIG. 3 the general array.

The conductors may be copper wires of diameter 50 microns coated with a lacquer layer which is a few microns thick and consists of a material commonly used for this purpose, for example, polyvinyl acetate or polyurethane, which layer is in turn coated with a second insulating low-melting-point layer, for example, of polyvinyl butyral, which is 10 microns thick, so that the overall diameter is, for example, 75 microns.

To form the system of conductors which cross one another at right angles the conductors may be wound on a rectangular frame in two orthogonal directions and may directly be soldered to terminals provided on the frame. The spacing between center lines of the wires may, for example, be 0.3 mm.

Subsequently the assembly is heated to a temperature such that the outer insulating layer is liquefied, the inner insulating layer maintaining the conductors insulated from one another. Owing to the capillarity the material of the outer layer fills the spaces between the perpendicularly crossing conductors of circular cross-section and owing to the surface tension it assumes a shape of the smallest possible surface area so that, after cooling, each crossover point of the conductors are mechanically joined by insulating bodies of smooth outline at the crossing points.

In order to metallize the wire system it may first, in known manner, be coated with a thin layer of metal, for example nickel, by chemical reduction, the magnetic metal layer being subsequently provided by electrodeposition using the said thin metal layer as an electrode. The magnetic metal layer may consist, for example, of 97% iron and 3% nickel and may be from 1 to 2 microns thick.

Thus, the conductors are coated both at the crossing points and in-between by a layer of magnetic material having a very constant thickness, which cannot be achieved in the same degree by means of vapour-deposition of a metal.

In known manner the magnetic material near the crossing points serves as an information carrier. Although there is magnetic material between the crossing points also, magnetic coupling between the memory locations is negligibly small owing to the slight thickness of the metal layer. This slight thickness of the metal layer also prevents the occurrence of inconvenient eddy currents in the layer at the crossings and ensures a high switching rate, and yet in reading the information the output voltage is comparatively large compared with the known storage matrices.

What is claimed is:

1. A method of manufacturing a magnetic storage matrix comprising the steps of arranging an assembly of first and second groups of mutually parallel conductors, the conducotrs of said first group crossing those of said second group at right angles, said conductors each having a first insulating layer surrounded by a second insulating layer, said second insulating layer having a thermal softening point lower than that of said first layer, heating said assembly to a temperature such that the material of the second insulating layer liquifies, said first layer maintaining said conductors insulated from one another, said second layer by capillarity filling the spaces between said crossing conductors and by surface tension assuming the shape of insulating bodies in the smallest possible surface area of smooth outline, cooling said assembly and thereby mechanically joining said crossing conductors by said insulating bodies, coating said assembly with a thin layer of a ferromagnetic material.

2. The method of claim 1 wherein said coating step includes coating said assembly with a first layer of metal and coating said first metal layer with a second metal layer, said second metal layer being magnetic.

3. The method of claim 2 wherein said first metal layer is deposited by chemical reduction and said second metal layer is electrodeposited, using said first layer as an electrode.

References Cited

UNITED STATES PATENTS

| | | | |
|---|---|---|---|
| 3,100,295 | 8/1963 | Schweizerhof | 29—604UX |
| 3,237,283 | 3/1966 | Shevel et al. | 29—604 |
| 3,370,348 | 2/1968 | Brownlow et al. | 29—604 |
| 3,412,354 | 11/1968 | Sattler | 29—605X |

JOHN F. CAMPBELL, Primary Examiner

C. E. HALL, Assistant Examiner

U.S. Cl. X.R.

340—174